United States Patent
Vallius

(10) Patent No.: US 10,429,645 B2
(45) Date of Patent: *Oct. 1, 2019

(54) DIFFRACTIVE OPTICAL ELEMENT WITH INTEGRATED IN-COUPLING, EXIT PUPIL EXPANSION, AND OUT-COUPLING

(71) Applicant: Microsoft Technology Licensing, LLC, Redmond, WA (US)

(72) Inventor: Tuomas Vallius, Espoo (FI)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 11 days.

This patent is subject to a terminal disclaimer.

(21) Appl. No.: 14/877,281

(22) Filed: Oct. 7, 2015

(65) Prior Publication Data

US 2017/0102543 A1 Apr. 13, 2017

(51) Int. Cl.
*G02B 27/14* (2006.01)
*G02B 27/01* (2006.01)
(Continued)

(52) U.S. Cl.
CPC ..... *G02B 27/0172* (2013.01); *G02B 27/0081* (2013.01); *G02B 27/0176* (2013.01);
(Continued)

(58) Field of Classification Search
CPC . G02B 27/14; G02B 5/18; G02B 6/34; G02B 27/0172
(Continued)

(56) References Cited

U.S. PATENT DOCUMENTS

| 3,980,883 A | 9/1976 | Franks |
| 4,711,512 A | 12/1987 | Upatnieks |

(Continued)

FOREIGN PATENT DOCUMENTS

| CN | 100433043 C | 10/2007 |
| CN | 102902060 A | 1/2013 |

(Continued)

OTHER PUBLICATIONS

"International Search Report & Written Opinion Issued in PCT Application No. PCT/US2016/039705", dated Sep. 15, 2016, (13 Pages total).

(Continued)

*Primary Examiner* — Audrey Y Chang
(74) *Attorney, Agent, or Firm* — Mark K. Young; Mayer & Williams PC

(57) ABSTRACT

In an optical near eye display system, a monolithic three-dimensional optical microstructure is formed by a waveguide substrate with at least one DOE having grating regions that integrate the functions of in-coupling of incident light into the waveguide, exit pupil expansion in one or two directions, and out-coupling of light from the waveguide within a single optical element. An in-coupling region of the DOE couples the incident light into the waveguide and to a beam steering and out-coupling region. The beam steering and out-coupling region provides exit pupil expansion and couples light out of the waveguide. The beam steering and out-coupling region of the DOE can be configured with a two-dimensional (2D) grating that is periodic in two directions.

19 Claims, 11 Drawing Sheets

(51) Int. Cl.
  *G02B 27/42* (2006.01)
  *G02B 27/00* (2006.01)
  *G06T 19/00* (2011.01)
(52) U.S. Cl.
  CPC ........ *G02B 27/4205* (2013.01); *G06T 19/006* (2013.01); *G02B 2027/015* (2013.01); *G02B 2027/0134* (2013.01); *G02B 2027/0152* (2013.01)
(58) Field of Classification Search
  USPC .................... 359/13, 569, 34, 571, 572, 630
  See application file for complete search history.

(56) References Cited

U.S. PATENT DOCUMENTS

| | | | |
|---|---|---|---|
| 4,743,083 A | 5/1988 | Schimpe | |
| 5,061,025 A | 10/1991 | Debesis | |
| 5,218,471 A | 6/1993 | Swanson et al. | |
| 5,224,198 A * | 6/1993 | Jachimowicz | G02B 6/003 |
| | | | 359/13 |
| 5,340,637 A | 8/1994 | Okai et al. | |
| 5,532,736 A | 7/1996 | Kuriki et al. | |
| 5,751,388 A | 5/1998 | Larson | |
| 5,907,427 A | 5/1999 | Scalora et al. | |
| 6,046,541 A | 4/2000 | Valliath | |
| 6,140,980 A | 10/2000 | Spitzer et al. | |
| 6,147,725 A | 11/2000 | Yuuki | |
| 6,232,044 B1 | 5/2001 | Gibbons et al. | |
| 6,259,561 B1 | 7/2001 | George et al. | |
| 6,410,213 B1 | 6/2002 | Raguin | |
| 6,580,529 B1 | 6/2003 | Amitai et al. | |
| 6,587,619 B1 | 7/2003 | Kinoshita | |
| 6,700,552 B2 | 3/2004 | Kollin et al. | |
| 6,833,956 B2 | 12/2004 | Lee | |
| 6,836,365 B2 | 12/2004 | Goto | |
| 6,873,463 B2 | 3/2005 | Nakai | |
| 6,909,546 B2 | 6/2005 | Hirai | |
| 6,950,227 B2 | 9/2005 | Schrader | |
| 6,990,275 B2 | 1/2006 | Kersten et al. | |
| 7,123,415 B2 | 10/2006 | Mercer | |
| 7,129,028 B2 | 10/2006 | Koeda et al. | |
| 7,224,854 B2 | 5/2007 | Ellwood, Jr. | |
| 7,236,251 B2 | 6/2007 | Takaoka | |
| 7,339,738 B1 | 3/2008 | Carr | |
| 7,391,524 B1 | 6/2008 | Chen et al. | |
| 7,483,604 B2 | 1/2009 | Levola | |
| 7,492,512 B2 | 2/2009 | Niv et al. | |
| 7,492,517 B2 | 2/2009 | McGrew | |
| 7,525,672 B1 | 4/2009 | Chen et al. | |
| 7,565,041 B2 | 7/2009 | Little et al. | |
| 7,573,640 B2 | 8/2009 | Nivon et al. | |
| 7,576,866 B2 | 8/2009 | Ohkubo | |
| 7,627,018 B1 | 12/2009 | Guilfoyle | |
| 7,710,628 B2 | 5/2010 | Morizono et al. | |
| 7,719,675 B2 | 5/2010 | Grygier et al. | |
| 7,738,746 B2 | 6/2010 | Charters et al. | |
| 7,959,308 B2 | 6/2011 | Freeman et al. | |
| 7,981,591 B2 | 7/2011 | Li et al. | |
| 8,135,227 B2 | 3/2012 | Lewis et al. | |
| 8,152,307 B2 | 4/2012 | Duelli et al. | |
| 8,160,411 B2 | 4/2012 | Levola et al. | |
| 8,208,191 B2 | 6/2012 | Gan et al. | |
| 8,233,204 B1 | 7/2012 | Robbins | |
| 8,314,993 B2 | 11/2012 | Levola | |
| 8,320,032 B2 | 11/2012 | Levola | |
| 8,376,548 B2 | 2/2013 | Schultz | |
| 8,463,080 B1 | 6/2013 | Anderson et al. | |
| 8,466,953 B2 | 6/2013 | Levola | |
| 8,482,859 B2 | 7/2013 | Border et al. | |
| 8,488,246 B2 | 7/2013 | Border et al. | |
| 8,508,848 B2 | 8/2013 | Saarikko | |
| 8,547,638 B2 | 10/2013 | Levola | |
| 8,548,290 B2 | 10/2013 | Travers | |
| 8,579,492 B2 | 11/2013 | Epstein et al. | |
| 8,593,734 B2 * | 11/2013 | Laakkonen | G02B 6/12007 |
| | | | 359/13 |
| 8,675,182 B2 | 3/2014 | Bamji | |
| 8,681,184 B2 | 3/2014 | Seesselberg | |
| 8,699,137 B2 | 4/2014 | McGrew | |
| 8,736,963 B2 | 5/2014 | Robbins et al. | |
| 8,749,796 B2 | 6/2014 | Pesach et al. | |
| 8,792,169 B2 | 7/2014 | Jiang et al. | |
| 8,830,584 B2 | 9/2014 | Saarikko | |
| 8,903,207 B1 | 12/2014 | Brown et al. | |
| 9,239,471 B2 * | 1/2016 | Zalevsky | G02B 5/1895 |
| 9,341,846 B2 * | 5/2016 | Popovich | G02B 27/0176 |
| 9,671,615 B1 | 6/2017 | Vallius | |
| 9,864,208 B2 | 1/2018 | Vallius et al. | |
| 9,910,276 B2 | 3/2018 | Vallius et al. | |
| 9,927,614 B2 | 3/2018 | Vallius | |
| 9,946,072 B2 | 4/2018 | Vallius | |
| 10,038,840 B2 * | 7/2018 | Vallius | H04N 5/23229 |
| 10,073,278 B2 | 9/2018 | Vallius | |
| 2001/0015851 A1 | 8/2001 | Danziger | |
| 2001/0033716 A1 | 10/2001 | Fukutomi | |
| 2001/0036012 A1 | 11/2001 | Nakai | |
| 2002/0080491 A1 | 6/2002 | Goto | |
| 2003/0107787 A1 | 6/2003 | Bablumyan | |
| 2004/0062502 A1 | 4/2004 | Levola | |
| 2004/0071180 A1 | 4/2004 | Wang | |
| 2004/0170356 A1 | 9/2004 | Iazikov | |
| 2004/0184147 A1 * | 9/2004 | Parikka | G02B 1/11 |
| | | | 359/487.01 |
| 2004/0218172 A1 | 11/2004 | DeVerse et al. | |
| 2004/0233534 A1 | 11/2004 | Nakanishi | |
| 2005/0002611 A1 | 1/2005 | Levola | |
| 2005/0180674 A1 | 8/2005 | Ellwood, Jr. | |
| 2005/0189315 A1 | 9/2005 | Knight et al. | |
| 2006/0056028 A1 | 3/2006 | Wildnauer | |
| 2006/0132914 A1 * | 6/2006 | Weiss | G02B 5/32 |
| | | | 359/462 |
| 2006/0221448 A1 | 10/2006 | Nivon et al. | |
| 2007/0008624 A1 | 1/2007 | Hirayama | |
| 2007/0188837 A1 | 8/2007 | Shimizu et al. | |
| 2007/0201795 A1 | 8/2007 | Rice et al. | |
| 2007/0242253 A1 | 10/2007 | Visser et al. | |
| 2007/0291362 A1 | 12/2007 | Hill | |
| 2008/0043334 A1 | 2/2008 | Itzkovitch | |
| 2008/0138013 A1 | 6/2008 | Parriaux | |
| 2008/0212921 A1 | 9/2008 | Gaylord | |
| 2008/0297731 A1 | 12/2008 | Powell et al. | |
| 2009/0009486 A1 | 1/2009 | Sato | |
| 2009/0040607 A1 | 2/2009 | Amako | |
| 2009/0128911 A1 | 5/2009 | Itzkovitch et al. | |
| 2009/0180166 A1 | 7/2009 | Hefetz et al. | |
| 2009/0245730 A1 | 10/2009 | Kleemann | |
| 2009/0257106 A1 | 10/2009 | Tan | |
| 2009/0303599 A1 | 10/2009 | Levola | |
| 2010/0079865 A1 | 4/2010 | Saarikko | |
| 2010/0134534 A1 | 6/2010 | Seesselberg | |
| 2010/0149073 A1 | 6/2010 | Chaum et al. | |
| 2010/0177388 A1 | 7/2010 | Cohen et al. | |
| 2010/0201953 A1 | 8/2010 | Freeman et al. | |
| 2010/0231693 A1 | 9/2010 | Levola | |
| 2010/0232016 A1 | 9/2010 | Landa | |
| 2010/0277803 A1 | 11/2010 | Pockett | |
| 2010/0284085 A1 | 11/2010 | Laakkonen | |
| 2010/0296163 A1 | 11/2010 | Saarikko | |
| 2010/0315719 A1 * | 12/2010 | Saarikko | G02B 27/0081 |
| | | | 359/630 |
| 2010/0321781 A1 * | 12/2010 | Levola | G02B 27/0081 |
| | | | 359/569 |
| 2011/0002143 A1 | 1/2011 | Saarikko et al. | |
| 2011/0019874 A1 | 1/2011 | Jarvenpaa | |
| 2011/0038049 A1 | 2/2011 | Vallius | |
| 2011/0096401 A1 | 4/2011 | Levola | |
| 2011/0115733 A1 | 5/2011 | Shih | |
| 2011/0261366 A1 | 10/2011 | Tearney | |
| 2012/0019647 A1 | 1/2012 | Kempe et al. | |
| 2012/0075168 A1 | 3/2012 | Osterhout et al. | |
| 2012/0120365 A1 | 5/2012 | Legerton | |
| 2012/0224062 A1 | 9/2012 | Lacoste | |
| 2013/0051730 A1 | 2/2013 | Travers | |

(56) References Cited

U.S. PATENT DOCUMENTS

| | | |
|---|---|---|
| 2013/0077049 A1 | 3/2013 | Bohn |
| 2013/0100362 A1 | 4/2013 | Saeedi et al. |
| 2013/0135193 A1 | 5/2013 | Fike, III |
| 2013/0222384 A1 | 8/2013 | Futterer |
| 2013/0242392 A1 | 9/2013 | Amirparviz et al. |
| 2013/0250430 A1 | 9/2013 | Robbins et al. |
| 2013/0261782 A1 | 10/2013 | Becken |
| 2013/0314793 A1 | 11/2013 | Robbins |
| 2013/0322810 A1 | 12/2013 | Robbins |
| 2014/0002608 A1 | 1/2014 | Atwell |
| 2014/0043689 A1 | 2/2014 | Mason |
| 2014/0064655 A1 | 3/2014 | Nguyen et al. |
| 2014/0104665 A1 | 4/2014 | Popovich et al. |
| 2014/0140654 A1 | 5/2014 | Brown et al. |
| 2014/0168167 A1 | 6/2014 | Chou |
| 2014/0168260 A1 | 6/2014 | O'Brien et al. |
| 2014/0185142 A1 | 7/2014 | Gupta et al. |
| 2014/0217385 A1 | 8/2014 | Gaertner et al. |
| 2014/0240613 A1 | 8/2014 | Bohn et al. |
| 2014/0240834 A1 | 8/2014 | Mason |
| 2014/0240843 A1 | 8/2014 | Kollin |
| 2014/0293434 A1 | 10/2014 | Cheng |
| 2014/0300695 A1 | 10/2014 | Smalley et al. |
| 2015/0034591 A1 | 2/2015 | Vink |
| 2015/0083917 A1 | 3/2015 | Wyrwas |
| 2015/0092042 A1 | 4/2015 | Fursich |
| 2015/0108337 A1 | 4/2015 | Goodwin |
| 2015/0108479 A1 | 4/2015 | Brinkley |
| 2015/0185475 A1 | 7/2015 | Saarikko |
| 2015/0234477 A1 | 8/2015 | Abovitz |
| 2015/0234491 A1 | 8/2015 | Liu |
| 2015/0277116 A1 | 10/2015 | Richards |
| 2015/0331544 A1 | 11/2015 | Bergstrom |
| 2015/0355394 A1 | 12/2015 | Valera |
| 2015/0382465 A1 | 12/2015 | Steyn |
| 2016/0018637 A1 | 1/2016 | Sparks |
| 2016/0026253 A1 | 1/2016 | Bradski |
| 2016/0116739 A1 | 4/2016 | TeKolste |
| 2016/0231478 A1 | 8/2016 | Kostamo |
| 2016/0231566 A1 | 8/2016 | Levola et al. |
| 2016/0231570 A1 | 8/2016 | Levola |
| 2016/0234485 A1 | 8/2016 | Robbins |
| 2016/0291405 A1 | 10/2016 | Frisken |
| 2016/0327789 A1 | 11/2016 | Klug |
| 2016/0334635 A1 | 11/2016 | Ushigome |
| 2017/0003504 A1 | 1/2017 | Vallius |
| 2017/0003505 A1 | 1/2017 | Vallius |
| 2017/0031171 A1 | 2/2017 | Vallius |
| 2017/0034435 A1* | 2/2017 | Vallius ............... H04N 5/23229 |
| 2017/0059879 A1 | 3/2017 | Vallius |
| 2017/0102543 A1 | 4/2017 | Vallius |
| 2017/0102544 A1 | 4/2017 | Vallius |
| 2017/0122725 A1 | 5/2017 | Yeoh |
| 2017/0123208 A1 | 5/2017 | Vallius |
| 2017/0124928 A1 | 5/2017 | Edwin |
| 2017/0131460 A1 | 5/2017 | Lin |
| 2017/0131545 A1 | 5/2017 | Wall |
| 2017/0131546 A1 | 5/2017 | Woltman |
| 2017/0131551 A1 | 5/2017 | Robbins |
| 2017/0139210 A1 | 5/2017 | Vallius |
| 2017/0153460 A1 | 6/2017 | Vallius et al. |
| 2017/0184848 A1 | 6/2017 | Vallius |

FOREIGN PATENT DOCUMENTS

| | | |
|---|---|---|
| CN | 103677448 A | 3/2014 |
| CN | 103995354 A | 8/2014 |
| EP | 2163924 A1 | 3/2010 |
| EP | 2752691 A1 | 7/2014 |
| EP | 2887119 A1 | 6/2015 |
| GB | 2495398 A | 4/2013 |
| JP | S6218502 A | 1/1987 |
| WO | 9504294 A2 | 2/1995 |
| WO | 99/52002 A1 | 10/1999 |
| WO | 2004055556 A1 | 7/2004 |
| WO | 2004109349 A2 | 12/2004 |
| WO | 2006064334 A1 | 6/2006 |
| WO | 2006132614 A1 | 12/2006 |
| WO | 2007141589 A1 | 12/2007 |
| WO | 2008038058 A1 | 4/2008 |
| WO | 2008081070 A1 | 7/2008 |
| WO | 2008148927 A1 | 12/2008 |
| WO | 2009077803 A1 | 6/2009 |
| WO | 2009101236 A1 | 8/2009 |
| WO | 2009101238 A1 | 8/2009 |
| WO | 2010062481 A1 | 1/2011 |
| WO | 2012169889 A1 | 12/2012 |
| WO | 2013033274 A1 | 3/2013 |
| WO | 2013144565 A1 | 10/2013 |
| WO | 2013167864 A1 | 11/2013 |
| WO | 2014019558 A1 | 2/2014 |
| WO | 2015063808 A1 | 5/2015 |
| WO | 2016130358 A1 | 8/2016 |

OTHER PUBLICATIONS

"International Search Report and Written Opinion Issued in PCT Application No. PCT/US2016/038857", dated Sep. 28, 2016, (16 Pages total).

"International Search Report and Written Opinion Issued in PCT Application No. PCT/US2016/039706", dated Oct. 6, 2016, (13 Pages total).

"International Search Report and Written Opinion Issued in PCT Application No. PCT/US2016/044947", dated Oct. 11, 2016, (14 Pages total).

"International Search Report and Written Opinion Issued in PCT Application No. PCT/US2016/037460", dated Oct. 24, 2016, (12 Pages total).

"International Search Report and Written Opinion Issued in PCT Application No. PCT/US2016/051563", dated Nov. 18, 2016, 10 Pages.

"International Search Report and Written Opinion Issued in PCT Application No. PCT/US2016/052405", dated Dec. 21, 2016, (10 Pages total).

Platte, et al, "Optically Induced Mask-Controlled Time-Variable Periodic Microwave Structures", In IEEE Transactions on Microwave Theory and Techniques, vol. 48, Issue 5, May 2000, (6 pages total).

Srinivasan, Pradeep, "Design and Fabrication of Space Variant Micro Optical Elements", In Doctoral Dissertation, Retrieved on: Nov. 27, 2014, Available at: http://etd.fcla.edu/CF/CFE0002843/Srinivasan_Pradeep_200908_PhD.pdf (160 pages total).

Mirza, et al., "Key Challenges to Affordable See Through Wearable Displays: The Missing Link for Mobile AR Mass Deployment", In Proceedings of SPIE 8720, Photonic Applications for Aerospace, Commercial, and Harsh Environments IV, May 31, 2013, pp. 1-6. (6 pages total).

Levola, Tapani, "Diffractive Optics for Virtual Reality Displays", In Journal of the Society for Information Display, Dec. 2006, (1 page total).

Saarikko, Pasi, "Diffractive Exit-Pupil Expander with a Large Field of View", In Proceedings of Photonics in Multimedia II, 700105 SPIE 7001, Apr. 25, 2008, (3 Pages total).

Kimmel, Jyrki, "Mobile Display Backlight Light Guide Plates Based on Slanted Grating Arrays", In Proceedings of Journal of Photonics for Energy, vol. 2, Mar. 12, 2012, (1 Page total).

Levola, et al., "Replicated Slanted Gratings with a High Refractive Index Material for in and Outcoupling of Light", In Proceedings of Optics Express, vol. 15, Issue 5, Mar. 5, 2007, (8 pages total).

Yang, et al., "High-performance and Compact Binary Blazed Grating Coupler Based on an Asymmetric Subgrating Structure and Vertical Coupling", In Optics Letters, vol. 36, No. 14, Jul. 15, 2011, (5 pages total).

Todd, Michael D., "Fiber Optic Bragg Grating-Based Sensing", Published on: Jun. 15, 2012, Available at: http://www.sem.org/pdf/fiber_bragg_grating_sensing.pdf (36 pages total).

Zhang, et al., "Advances in Optical Fiber Bragg Grating Sensor Technologies", In Photonic Sensors, vol. 2, No. 1, Mar. 2012, (13 pages total).

(56) References Cited

OTHER PUBLICATIONS

Uranga, et al., "Focused Ion Beam Nano-structuring of Photonic Bragg Gratings in Al2o3 Waveguides", In Proceedings of 12th Annual Symposium IEEE/LEOS Benelux, Dec. 17, 2007, (4 pages total).
Cheng, et al., "Design of an Ultra-Thin Near-Eye Display with Geometrical Waveguide and Freeform Optics", In Proceedings of Optics Express, vol. 22, Issue 17, Aug. 2014, (15 pages total).
Wang, et al., "Guided-Mode Resonance in Planar Dielectric-Layer Diffraction Gratings", In Journal of Optics Infobase, vol. 7, Isuue 8, Aug. 1, 1990, (3 pages total).
Sentenac, et al., "Angular Tolerant Resonant Grating Filters under Oblique Incidence", Journal of Optics Soc. Am. A, vol. 22, No. 4, Mar. 2005, pp. 475-480 (6 pages total).
Powell, et al., "Novel Approach to Exit Pupil Expansion for Wearable Displays", In Proceeding of the SPIE 4711, Helmet- and Head-Mounted Displays VII, Aug. 5, 2002, (3 pages total).
Urey, et al, "Microlens Array-Based Exit Pupil Expander for Full-Color Display Applications", In Proceedings of SPIE in Photon Management, vol. 5456, Apr. 2004, (10 pages total).
Zhu, et , "Optical Image Encryption Based on Interference of Polarized Light", In Proceedings of Optics Express, vol. 17, No. 16, Jul. 20, 2009, (7 pages total).
"International Search Report and Written Opinion Issued in PCT Application No. PCT/US2016/058332", dated Feb. 21, 2017, 14 Pages.
Saarikko, et al., "Diffractive Exit-pupil Expander for Spherical Light Guide Virtual Displays Designed for Near-Distance Viewing", In the Journal of Optics A: Pure and Applied Optics, vol. 11, Issue 6, Mar. 31, 2009, 10 Pages.
"Second Written Opinion Issued in PCT Application No. PCT/US2016/039706", dated Jun. 27, 2017, (5 Pages total).
"Second Written Opinion Issued in PCT Application No. PCT/US2016/039705", dated Jul. 10, 2017, (7 Pages total).
"Second Written Opinion Issued in PCT Application No. PCT/US2016/044947", dated Jul. 13, 2017, (8 Pages total).
"Second Written Opinion Issued in PCT Application No. PCT/US2016/051563", dated Aug. 17, 2017, 5 Pages.
Final Office Action received in U.S. Appl. No. 14/878,727, dated Dec. 12, 2017, 16 pages.
Notification of Transmittal of the International Preliminary Report on Patentability received in PCT/US2016/037460, dated Oct. 17, 2017, 13 pages.
Notification of Transmittal of the International Preliminary Report on Patentability received in PCT/US2016/044947, dated Nov. 16, 2017, 17 pages.
"Waveguide-based Displays Maturing for Augmented Reality Applications", Retrieved from <<https://web.archive.org/web/20160419212709/http://www.displaydaily.com/articles/446-free-sponsored-contents/sponsored-articles/14132-waveguide-based-displays-maturing-for-augmented-reality-applications>>, Apr. 19, 2016, 5 Pages.
"Second Written Opinion Issued in PCT Application No. PCT/US2016/061014", dated Nov. 3, 2017, 5 Pages.
"International Search Report and Written Opinion Issued in PCT Application No. PCT/US2016/061014", dated Feb. 10, 2017, 11 Pages.
"Final Office Action Issued in U.S. Appl. No. 14/788,174", dated Jun. 15, 2017, 13 Pages.
"Non Final Office Action Issued in U.S. Appl. No. 14/788,174", dated Feb. 17, 2017,15 Pages.
"Notice of Allowance Issued in U.S. Appl. No. 14/788,174", dated Oct. 24, 2017,9 Pages.
"Notice of Allowance Issued in U.S. Appl. No. 14/788,174", dated Dec. 4, 2017, 2 Pages.
"Advisory Action Issued in U.S. Appl. No. 14/790,379", dated Nov. 20, 2017, 3 Pages.
"International Preliminary Report on Patentability Issued in PCT Application No. PCT/US2016/058332", dated Feb. 13, 2018, 11 Pages.
"International Preliminary Report on Patentability Issued in PCT Application No. PCT/US2016/051563", dated Jan. 22, 2018,7 Pages.
"Final Office Action Issued in U.S. Appl. No. 14/790,379", dated Sep. 7, 2017,11 Pages.
"Non Final Office Action Issued in U.S. Appl. No. 14/790,379", dated Jan. 10, 2018, 9 Pages.
"Non-Final Office Action Issued in U.S. Appl. No. 14/790,379", dated Mar. 24, 2017, 9 Pages.
"International Preliminary Report on Patentability Issued in PCT Application No. PCT/US2016/039706", dated Oct. 31, 2017, 6 Pages.
"Non Final Office Action Issued in U.S. Appl. No. 14/813,245", dated Sep. 8, 2017, 7 Pages.
"Notice of Allowance Issued in U.S. Appl. No. 14/813,245", dated Apr. 10, 2018, 9 Pages.
"International Preliminary Report on Patentability Issued in PCT Application No. PCT/US2016/039705", dated Nov. 16, 2017, 8 Pages.
"Non Final Office Action Issued in U.S. Appl. No. 14/813,305", dated Jun. 6, 2017, 23 Pages.
"Notice of Allowance Issued in U.S. Appl. No. 14/813,305", dated Sep. 22, 2017, 9 Pages.
"Second Written Opinion Issued in PCT Application No. PCT/US/2016/058332", dated Dec. 14, 2017,10 Pages.
"Final Office Action Issued in U.S. Appl. No. 14/837,626", dated Dec. 19, 2017, 10 Pages.
"Non Final Office Action Issued in U.S. Appl. No. 14/837,626", dated Jun. 16, 2017, 13 Pages.
"Notice of Allowance Issued in U.S. Appl. No. 14/837,626", dated Apr. 23, 2018, 9 Pages.
"Non Final Office Action Issued in U.S. Appl. No. 14/878,727", dated Apr. 20, 2017, 9 Pages.
"Non Final Office Action Issued in U.S. Appl. No. 14/878,727", dated Apr. 2, 2018, 12 Pages.
"Non Final Office Action Issued in U.S. Appl. No. 14/926,643", dated Jun. 9, 2017, 23 Pages.
"Notice of Allowance Issued in U.S. Appl. No. 14/926,643", dated Dec. 13, 2017, 9 Pages.
"Non Final Office Action Issued in U.S. Appl. No. 14/942,408", dated Dec. 14, 2017, 15 Pages.
"Non Final Office Action Issued in U.S. Appl. No. 14/790,379", dated Nov. 5, 2018, 11 Pages.
"Non Final Office Action Issued in U.S. Appl. No. 14/790,379", dated Jun. 22, 2018, 9 Pages.
"Notice of Allowance Issued in U.S. Appl. No. 14/878,727", dated Oct. 4, 2018, 11 Pages.
"Final Office Action Issued in U.S. Appl. No. 14/942,408", dated Jul. 10, 2018, 12 Pages.

* cited by examiner

US 10,429,645 B2

DIFFRACTIVE OPTICAL ELEMENT WITH INTEGRATED IN-COUPLING, EXIT PUPIL EXPANSION, AND OUT-COUPLING

BACKGROUND

Diffractive optical elements (DOEs) are optical elements with a periodic structure that are commonly utilized in applications ranging from bio-technology, material processing, sensing, and testing to technical optics and optical metrology. By incorporating DOEs in an optical field of a laser or emissive display, for example, the light's "shape" can be controlled and changed flexibly according to application needs.

SUMMARY

In an optical near eye display system, a monolithic three-dimensional optical microstructure is formed by a waveguide substrate with at least one DOE having grating regions that integrate the functions of in-coupling of incident light into the waveguide, exit pupil expansion in one or two directions, and out-coupling of light from the waveguide within a single optical element. An in-coupling region of the DOE couples the incident light into the waveguide and to a beam steering and out-coupling region of the DOE. The beam steering and out-coupling region provides exit pupil expansion and couples light out of the waveguide. The beam steering and out-coupling region of the DOE can be configured with a two-dimensional (2D) grating that is periodic in two directions. The 2D grating provides multiple optical paths to a given point in the beam steering and out-coupling region of the DOE in which the differences in the optical path lengths are larger than the coherence length. As a result, optical interference is reduced in the display system and display uniformity and optical resolution is increased.

Optical interference is typically manifested as dark stripes in the display which is referred to as "banding." Banding may be more pronounced when polymeric materials are used in volume production of the DOE to minimize system weight as polymeric materials may have less optimal optical properties compared with other materials such as glass. Furthermore, by integrating the in-coupling, exit pupil expansion, and out-coupling functions into a single monolithic optical microstructure of the DOE, discontinuities at boundaries between gratings are eliminated which may further increase optical resolution in the near eye display system. In addition, the integrated DOE can reduce overall component count and weight which can be desirable in applications such as head mounted display (HMD).

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure.

DESCRIPTION OF THE DRAWINGS

Like reference numerals indicate like elements in the drawings. Elements are not drawn to scale unless otherwise indicated.

DETAILED DESCRIPTION

Figure 1:
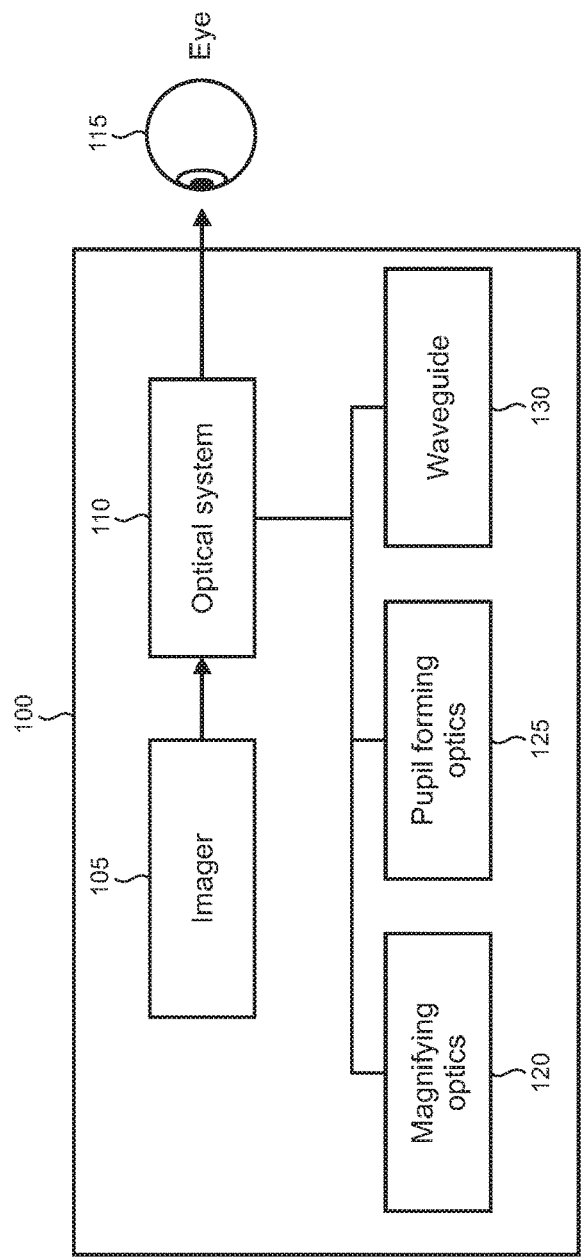
FIG. 1 shows a block diagram of an illustrative near eye display system which may incorporate a diffractive optical element (DOE) with integrated in-coupling, pupil expansion, and out-coupling.

FIG. 1 shows a block diagram of an illustrative optical near eye display system 100 which may incorporate one or more diffractive optical elements (DOEs) with integrated in-coupling, exit pupil expansion in one or two directions, and out-coupling using a monolithic waveguide substrate. Near eye display systems are frequently used, for example, in head mounted display (HMD) devices in industrial, commercial, and consumer applications. Other devices and systems may also use DOEs with integrated in-coupling, exit pupil expansion in one or two directions, and out-coupling, as described below. The near eye display system 100 is intended to be an example that is used to illustrate various features and aspects, and the present DOEs are not necessarily limited to near eye display systems.

System 100 may include an imager 105 that works with an optical system 110 to deliver images as a virtual display to a user's eye 115. The imager 105 may include, for example, RGB (red, green, blue) light emitting diodes (LEDs), LCOS (liquid crystal on silicon) devices, OLED (organic light emitting diode) arrays, MEMS (micro-electro mechanical system) devices, or any other suitable displays or micro-displays operating in transmission, reflection, or emission. The imager 105 may also include mirrors and other components that enable a virtual display to be composed and provide one or more input optical beams to the optical system. The optical system 110 can typically include magnifying optics 120, pupil forming optics 125, and one or more waveguides 130.

In a near eye display system the imager does not actually shine the images on a surface such as a glass lens to create the visual display for the user. This is not feasible because the human eye cannot focus on something that is that close. Indeed, rather than create a visible image on a surface, the near eye optical system 100 uses the pupil forming optics 125 to form a pupil and the eye 115 acts as the last element in the optical chain and converts the light from the pupil into an image on the eye's retina as a virtual display.

Figure 2:
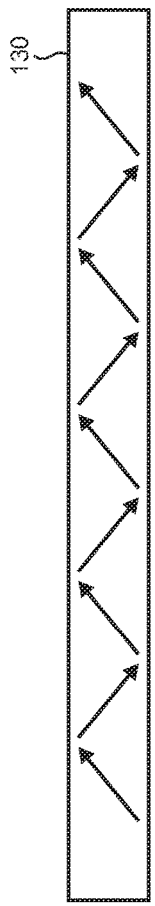
FIG. 2 shows propagation of light in a waveguide by total internal reflection.

The waveguide 130 facilitates light transmission between the imager and the eye. One or more waveguides can be utilized in the near eye display system because they are transparent and because they are generally small and lightweight (which is desirable in applications such as HMD devices where size and weight is generally sought to be minimized for reasons of performance and user comfort). For example, the waveguide 130 can enable the imager 105 to be located out of the way, for example, on the side of the head, leaving only a relatively small, light, and transparent waveguide optical element in front of the eyes. In one implementation, the waveguide 130 operates using a principle of total internal reflection, as shown in FIG. 2, so that light can be coupled among the various optical elements in the system 100.

Figure 3:
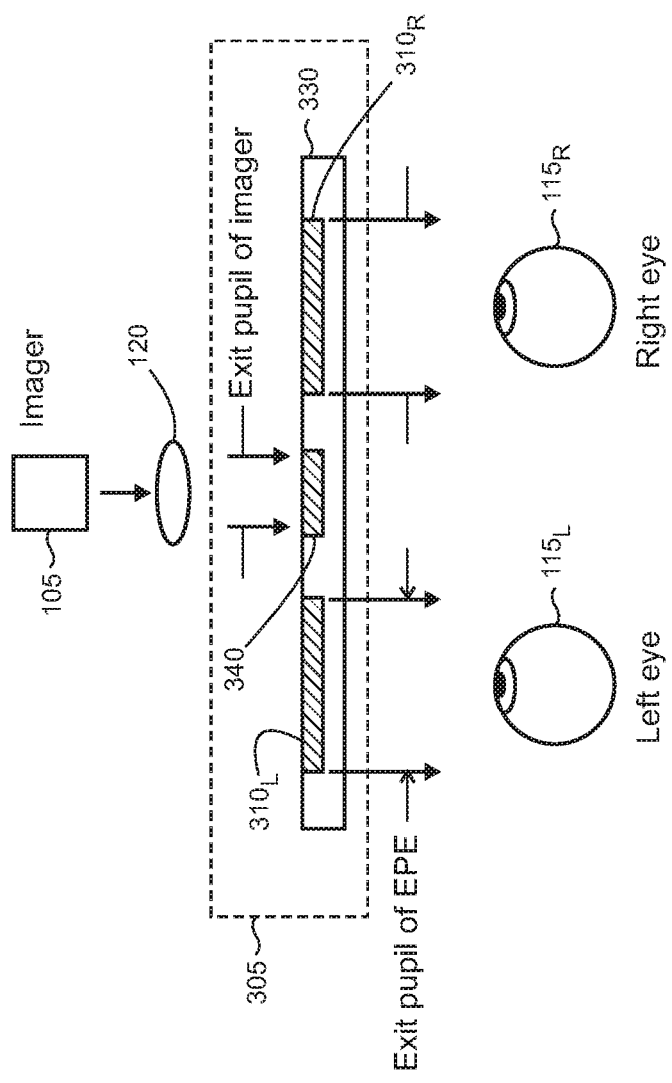
FIG. 3 shows a view of an illustrative exit pupil expander.

FIG. 3 shows a view of an illustrative exit pupil expander (EPE) 305. EPE 305 receives an input optical beam from the imager 105 through magnifying optics 120 to produce one or more output optical beams with expanded exit pupil in one or two directions relative to the exit pupil of the imager (in general, the input may include more than one optical beam which may be produced by separate sources). The expanded exit pupil typically facilitates a virtual display to be sufficiently sized to meet the various design requirements of a given optical system, such as image resolution, field of view, and the like, while enabling the imager and associated components to be relatively light and compact.

The EPE 305 is configured, in this illustrative example, to support binocular operation for both the left and right eyes. Components that may be utilized for stereoscopic operation such as scanning mirrors, lenses, filters, beam splitters, MEMS devices, or the like are not shown in FIG. 3 for sake of clarity in exposition. The EPE 305 utilizes two out-coupling gratings, $310_L$ and $310_R$ that are supported on a waveguide 330 and a central in-coupling grating 340. The in-coupling and out-coupling gratings may be configured using multiple DOEs, as described in the illustrative example below. While the EPE 305 is depicted as having a planar configuration, other shapes may also be utilized including, for example, curved or partially spherical shapes, in which case the gratings disposed thereon are non-coplanar.

Figure 4:
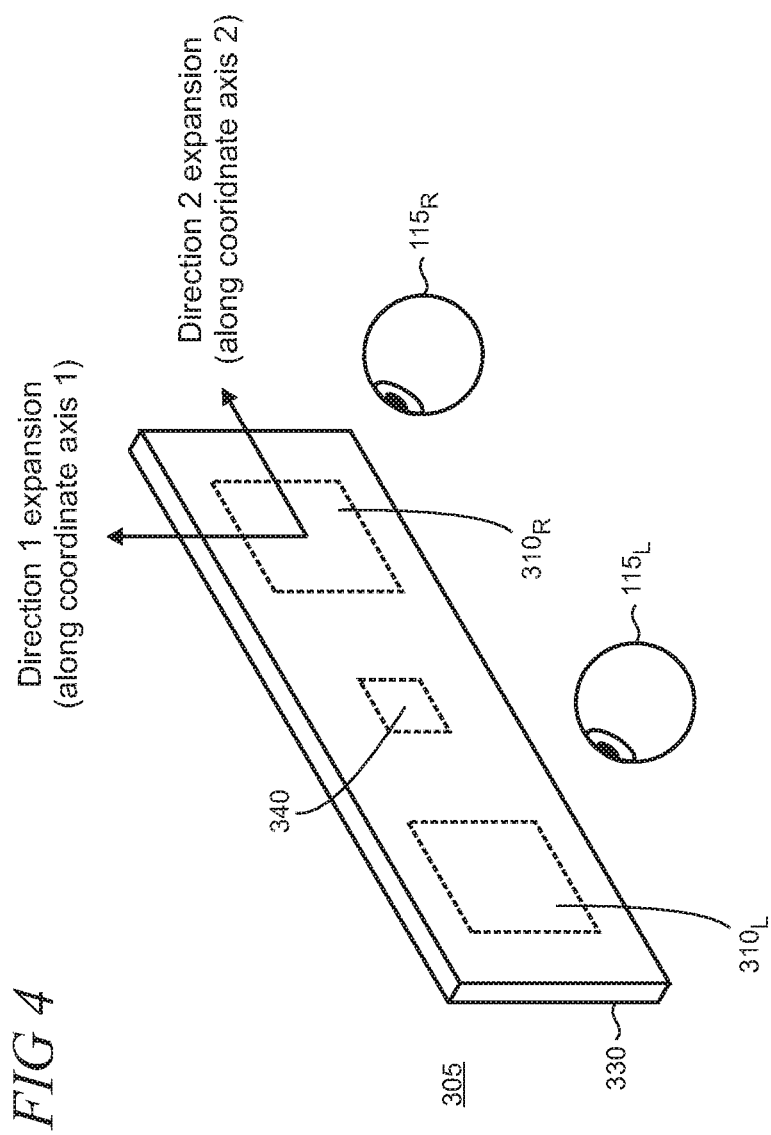
FIG. 4 shows a view of the illustrative exit pupil expander in which the exit pupil is expanded along two directions.

As shown in FIG. 4, the EPE 305 may be configured to provide an expanded exit pupil in two directions (i.e., along each of a first and second coordinate axis). As shown, the exit pupil is expanded in both the vertical and horizontal directions. It may be understood that the terms "direction," "horizontal," and "vertical" are used primarily to establish relative orientations in the illustrative examples shown and described herein for ease of description. These terms may be intuitive for a usage scenario in which the user of the near eye display device is upright and forward facing, but less intuitive for other usage scenarios. The listed terms are not to be construed to limit the scope of the configurations (and usage scenarios therein) of DOEs with integrated in-coupling, pupil expansion, and out-coupling.

Figure 5:
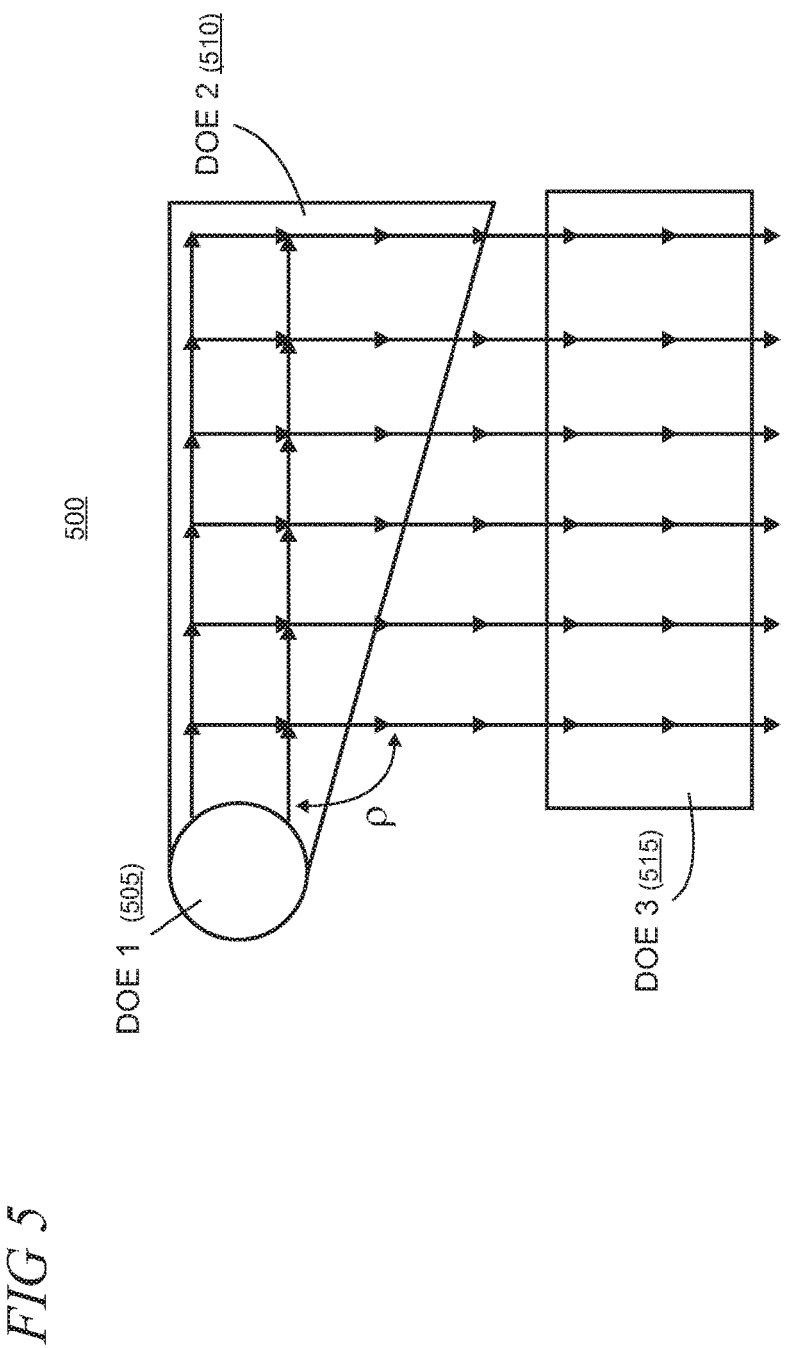
FIG. 5 shows an illustrative arrangement of three discrete DOEs.

FIG. 5 shows an illustrative arrangement 500 of three discrete DOEs that may be used as part of a waveguide to provide in-coupling and expansion of the exit pupil in two directions. In this illustrative example, each DOE is an optical element comprising a periodic structure that can modulate various properties of light in a one-dimensional (1D) periodic pattern such as the direction of optical axis, optical path length, and the like. The first DOE, DOE 1 (indicated by reference numeral 505), is configured to couple the beam from the imager into the waveguide. The second DOE, DOE 2 (510), expands the exit pupil in a first direction along a first coordinate axis, and the third DOE, DOE 3 (515), expands the exit pupil in a second direction along a second coordinate axis and couples light out of the waveguide. The angle η is a rotation angle between the periodic lines of DOE 2 and DOE 3 as shown. DOE 1 thus functions as an in-coupling grating and DOE 3 functions as an out-coupling grating while expanding the pupil in one direction. DOE 2 may be viewed as an intermediate grating that functions to couple light between the in-coupling and out-coupling gratings while performing exit pupil expansion in the other direction. Using such intermediate grating may eliminate a need for conventional functionalities for exit pupil expansion in an EPE such as collimating lenses.

Some near eye display system applications, such as those using HMD devices for example, can benefit by minimization of weight and bulk. As a result, the DOEs and waveguides used in an EPE may be fabricated using lightweight polymers. Such polymeric components can support design goals for size, weight, and cost, and generally facilitate manufacturability, particularly in volume production settings. However, polymeric optical elements generally have lower optical resolution relative to heavier high quality glass. Such reduced optical resolution and the waveguide's configuration to be relatively thin for weight savings and packaging constraints within a device can result in optical interference that appears as a phenomenon referred to as "banding" in the display. The optical interference that results in banding arises from light propagating within the EPE that has several paths to the same location, in which the optical path lengths differ.

The banding is generally visible in the form of dark stripes which decrease optical uniformity of the display. Their location on the display may depend on small nanometer-scale variations in the optical elements including the DOEs in one or more of thickness, surface roughness, or grating geometry including grating line width, angle, fill factor, or the like. Such variation can be difficult to characterize and manage using tools that are generally available in manufacturing environments, and particularly for volume production. Conventional solutions to reduce banding include using thicker waveguides which can add weight and complicate package design for devices and systems. Other solutions use pupil expansion in the EPE in just one direction which can result in a narrow viewing angle and heightened sensitivity to natural eye variations among users.

The arrows in FIG. 5 show light propagating in DOE 2 when configured as a 1D grating that is periodic in one direction. As shown, light propagates from left to right in the waveguide and propagates downwards through refraction. As a result, light can loop around to any given point within DOE 2 over several paths in which the length of each path is essentially the same. However, since the differences in optical path lengths are smaller than the coherence length (i.e., a propagation distance over which the light may be considered coherent), even small differences in path length can result in strong interference in DOE 3 and reduce optical resolution, uniformity, and color balance in the optical display system. Use of a 1D grating for DOE 2 may also necessitate tight manufacturing tolerances to help reduce variability and achieve a target optical resolution. Maintaining tight manufacturing tolerances can be expensive and problematic, particularly for volume production of DOEs in the optical near eye display systems. Furthermore, the discontinuities presented by the boundaries between DOEs 1, 2, and 3 can typically cause undesired refraction which reduces optical resolution. In some implementations, the out-coupling DOE 3 may be apodized with shallow gratings in order to minimize the loss in optical resolution from the boundary with the upstream DOE.

Figure 6:
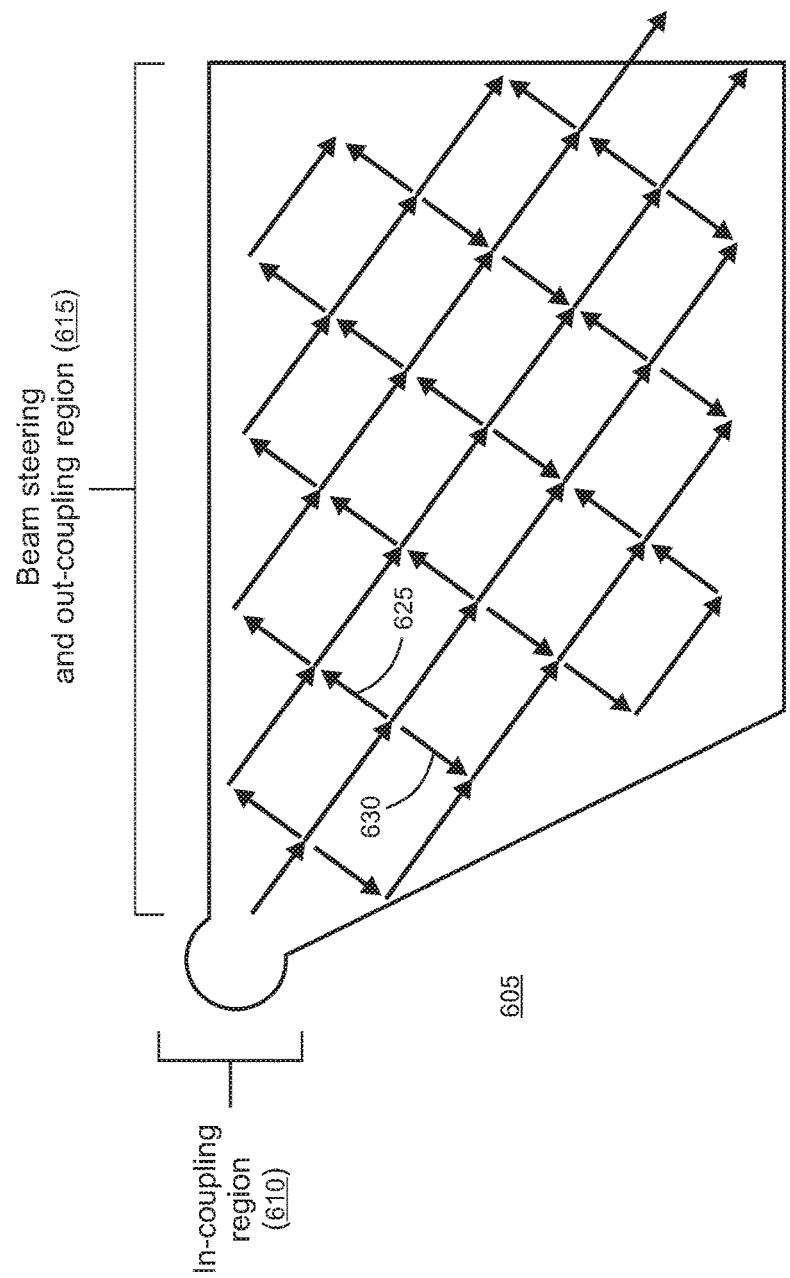
FIG. 6 shows an illustrative example of a monolithic DOE with integrated in-coupling, pupil expansion, and out-coupling.

By comparison to the DOE arrangement 500 using three discrete DOEs with 1D gratings shown in FIG. 5, FIG. 6 shows light propagation in a DOE 605 used in an EPE that integrates the functions of in-coupling of incident light, exit pupil expansion in one or two directions, and out-coupling light out of the EPE waveguide using a single monolithic optical structure. The term "monolithic" as used here refers to a unitary waveguide substrate without boundaries between the diffraction gratings that are formed thereon. For example, the waveguide substrate may be formed using a single piece of optical glass, polymer, or other suitable material and can include one or more DOEs that provide integrated optical functions.

An in-coupling region 610 of the DOE 605 couples incident light into the waveguide and to a downstream beam steering and out-coupling region 615 which couples light out of the waveguide with an expanded exit pupil in one or two directions compared to the incident light. The in-coupling region 610 may be configured as either a 1D grating, or as a 2D grating that is periodic in two directions. Such 2D gratings may be referred to as "crossed gratings" and the two directions may be, but are not necessarily, perpendicular.

In this illustrative example, the beam steering and out-coupling region 615 of the integrated DOE 605 is configured as 2D grating that is periodic in two directions. In this illustrative example as shown in FIG. 6, light propagates both up and to the right (in a "right path"), and down and to the left (in a "left path"), as representatively indicated by reference numerals 625 and 630 in FIG. 6. Light can arrive at a given point in the beam steering and out-coupling region 615 by looping along both the left paths and right paths. Unlike a 1D grating, the optical path lengths in the 2D grating in the beam steering and out-coupling region 615 are different for the different paths, and the differences in optical path lengths are larger than the coherence length. Optical interference is therefore minimized and optical resolution, uniformity, and color balance is increased in the display system as compared to the 1D grating configuration shown in FIG. 5. In addition, optical resolution is typically further increased in the integrated DOE 605 by reducing the undesired diffraction that would otherwise occur at the boundaries between discrete DOEs (e.g., DOEs 1, 2, and 3 in FIG. 5).

In this particular illustrative example, the beam steering and out-coupling region 615 of the DOE 605 is configured to simultaneously expand the exit pupil in two directions. However, in alternative implementations, the beam steering and out-coupling region may expand the exit pupil in one direction and an additional optical element or grating may perform exit pupil expansion in a second direction. Such additional element may be included as an integrated element within the monolithic structure of the waveguide in some implementations, or be embodied as a separate discrete component in the optical near eye display system in other implementations.

The 2D gratings for the in-coupling region 610 and the beam steering and out-coupling region 615 of the DOE 605 may utilize a variety of structures that are periodic in two directions according to the needs of a particular implementation. For example, FIGS. 7, 8, 9, and 10 depict various illustrative 2D gratings as respectively indicated by reference numerals 705, 805, 905, and 1005. The 2D gratings in the drawings are illustrative and not limiting, and it is contemplated that variations from the 2D gratings shown may also be utilized. Gratings may include symmetric and/or asymmetric features including slanted gratings (i.e., gratings having walls that are non-orthogonal according to one or more predetermined angles to a plane of the waveguide) and blazed gratings (i.e., gratings having asymmetric triangular or sawtooth profiles) in some cases. Various suitable surface relief contours, filling factors, grating periods, and grating dimensions can also be utilized according to the needs of a particular implementation.

Figure 8:
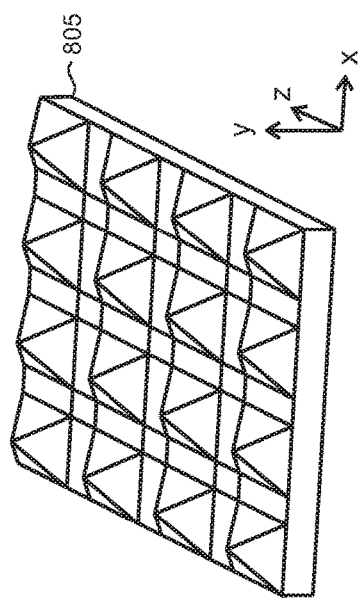
FIGS. 7-10 show various illustrative two-dimensional (2D) gratings.
Figure 10:
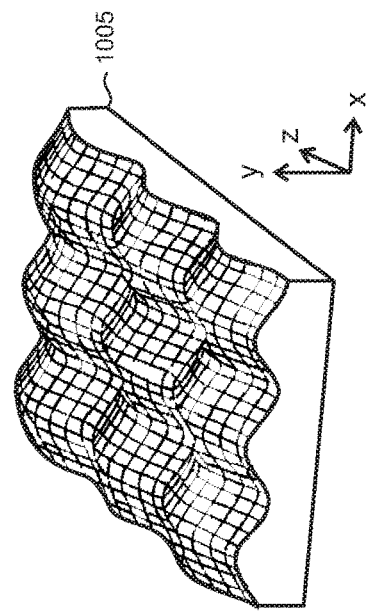
Figure 7:
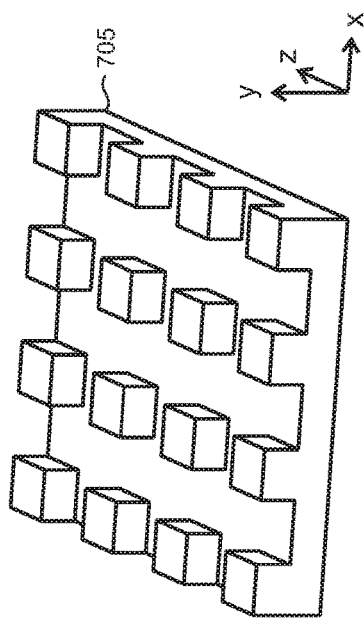
Figure 9:
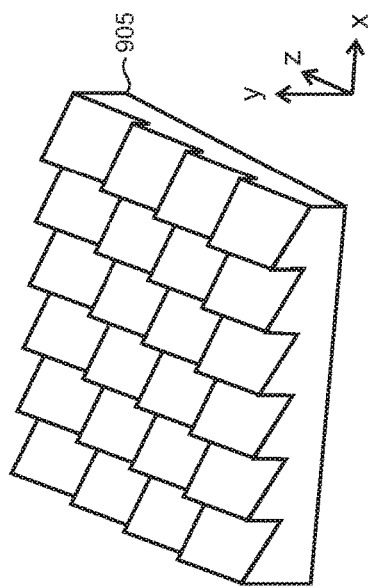

FIG. 7 shows a 2D grating 705 that includes quadrangular elements that project from a substrate. The quadrangular elements can also be configured to be asymmetric such as being slanted or blazed. Non-quadrangular three-dimensional geometries (both symmetric and asymmetric) may also be utilized for a 2D grating including, for example, cylindrical elements, polygonal elements, elliptical elements, or the like. For example, FIG. 8 shows a 2D grating 805 that includes pyramidal elements, and FIG. 9 shows a 2D grating 905 that includes elements that have a blazed profile in each of the x and z directions. Gratings may also have elements with curved profiles, as shown in the illustrative 2D grating 1005 in FIG. 10.

Figure 11:
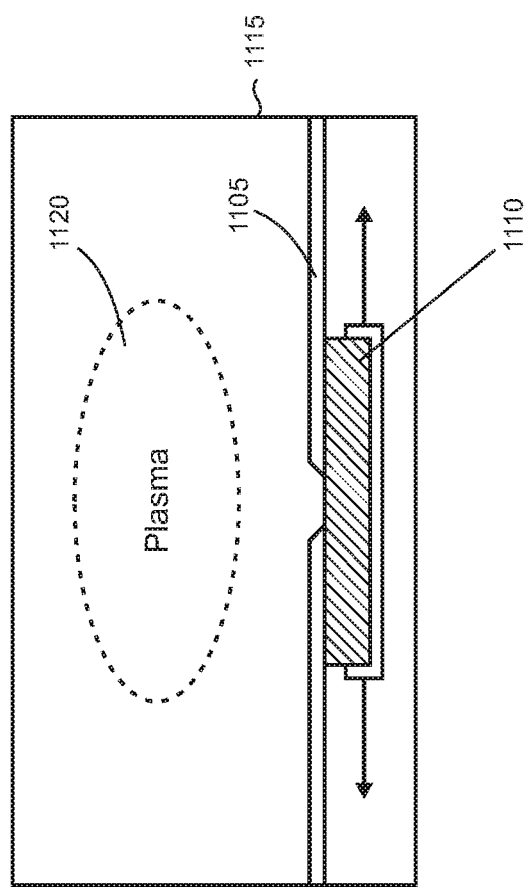
FIG. 11 shows an illustrative arrangement for DOE fabrication using a mask that moves relative to a substrate.

FIG. 11 shows an illustrative arrangement for DOE fabrication using a mask 1105 that moves relative to a photosensitive grating substrate 1110 within an enclosure 1115. A reactive ion etching plasma 1120 is used to adjust the thickness of the etching on the grating substrate at various positions by moving the substrate relative to the mask using, for example, a computer-controller stepper functionality or other suitable control system. In an illustrative example, the etching may be performed using a reactive ion beam etching (RIBE). However, other variations of ion beam etching may be utilized in various implementations including, for example, magnetron reactive ion etching (MRIE), high density plasma etching (HDP), transformer coupled plasma etching (TCP), inductively coupled plasma etching (ICP), and electron cyclotron resonance plasma etching (ECR).

Multi-beam interference holography may be used in some implementations to produce the two-direction periodic three-dimensional microstructures in a 2D grating in a DOE. In some manufacturing scenarios, multiple exposures may be utilized in which the substrate is rotated, for example by 90 degrees, between exposures.

Figure 12:
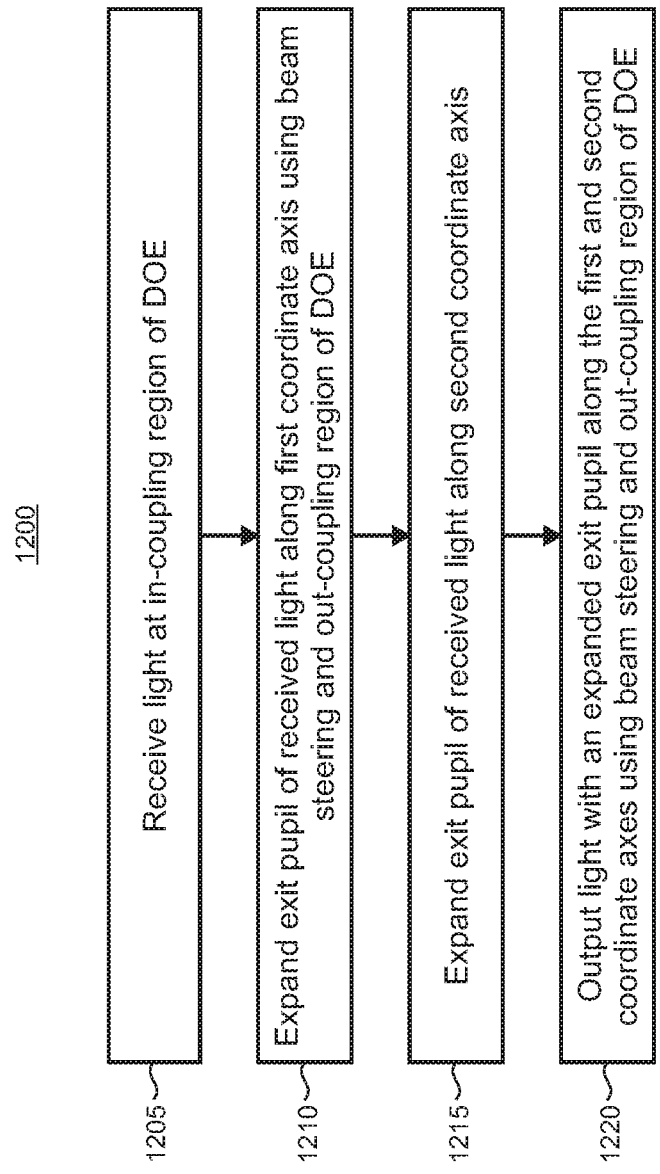
FIG. 12 shows an illustrative method.

FIG. 12 is a flowchart of an illustrative method 1200. Unless specifically stated, the methods or steps shown in the flowchart and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

In step 1205, light is received at an in-coupling region of a DOE. The DOE is configured as an EPE and integrates in-coupling, exit pupil expansion in one or two directions, and out-coupling within a single monolithic optical element. In step 1210, the exit pupil of the received light is expanded along a first coordinate axis using the beam steering and out-coupling region of the DOE. In step 1215, the exit pupil is expanded along a second coordinate axis. As noted above, the exit pupil expansion in the second direction may be performed using another optical element or DOE (which can be integrated in the waveguide or be implemented as a separate discrete element) in some alternative implementations. Accordingly, the in-coupling region of the DOE can be configured as either a 1D grating or as a 2D grating. The beam steering and out-coupling region of the DOE is configured as a 2D grating. In step 1220, light is output from the beam steering and out-coupling region of the DOE with an expanded exit pupil relative to the received light at the in-coupling region along the first and second coordinate axes.

A DOE with integrated in-coupling, exit pupil expansion, and out-coupling may be incorporated into a display system that is utilized in a virtual or mixed reality display device. Such device may take any suitable form, including but not limited to near-eye devices such as an HMD device. A see-through display may be used in some implementations while an opaque (i.e., non-see-through) display using a camera-based pass-through or outward facing sensor, for example, may be used in other implementations.

Figure 13:
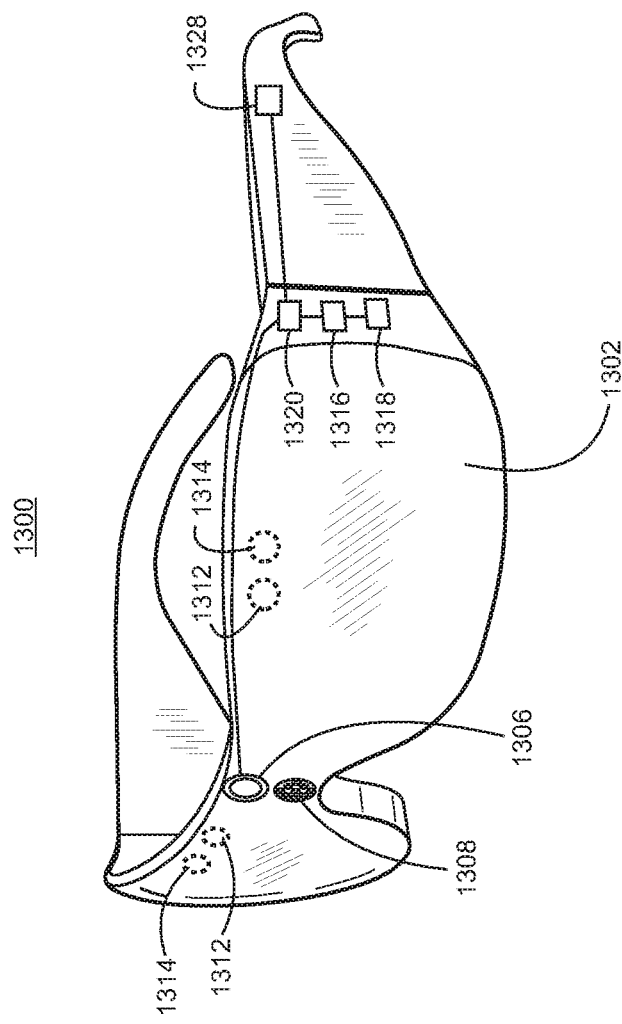
FIG. 13 is a pictorial view of an illustrative example of a virtual reality or mixed reality head mounted display (HMD) device.
Figure 14:
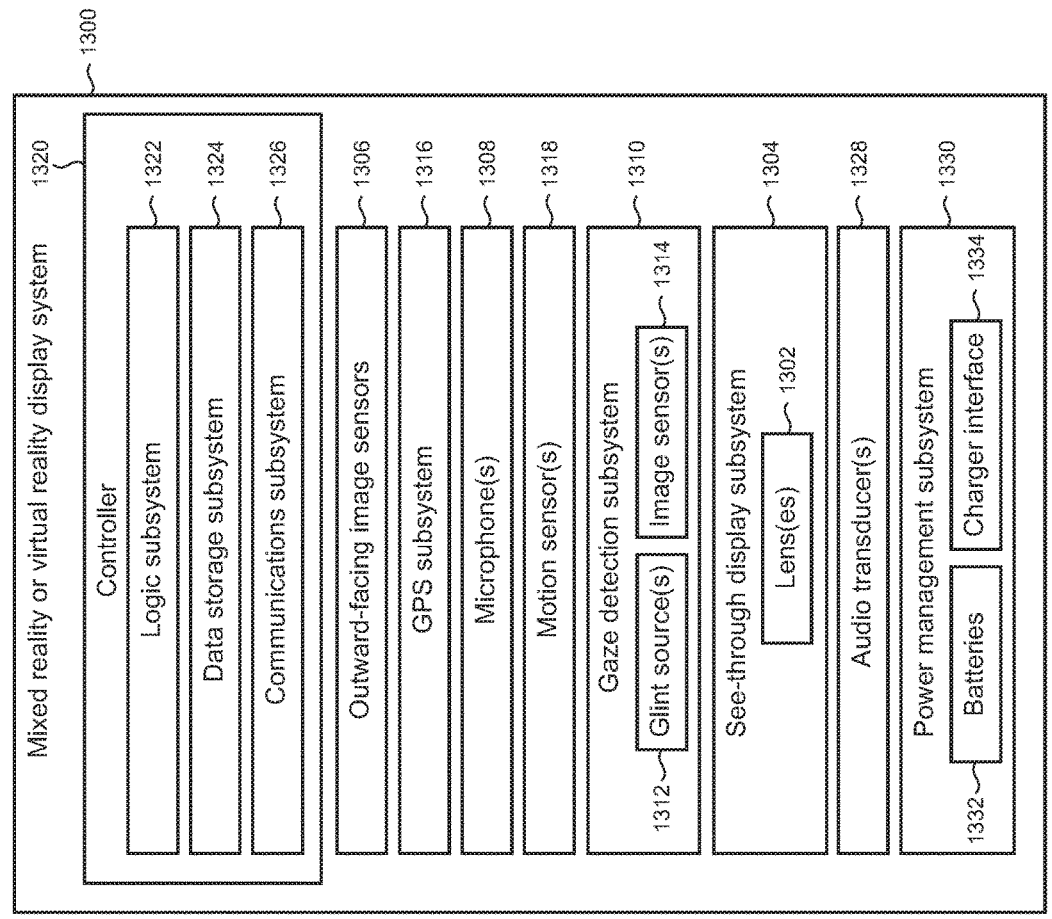
FIG. 14 shows a block diagram of an illustrative example of a virtual reality or mixed reality HMD device.

FIG. 13 shows one particular illustrative example of a see-through, mixed reality or virtual reality display system 1300, and FIG. 14 shows a functional block diagram of the system 1300. Display system 1300 comprises one or more lenses 1302 that form a part of a see-through display subsystem 1304, such that images may be displayed using lenses 1302 (e.g. using projection onto lenses 1302, one or more waveguide systems incorporated into the lenses 1302, and/or in any other suitable manner). Display system 1300 further comprises one or more outward-facing image sensors 1306 configured to acquire images of a background scene and/or physical environment being viewed by a user, and may include one or more microphones 1308 configured to detect sounds, such as voice commands from a user. Outward-facing image sensors 1306 may include one or more depth sensors and/or one or more two-dimensional image sensors. In alternative arrangements, as noted above, a mixed reality or virtual reality display system, instead of incorporating a see-through display subsystem, may display mixed reality or virtual reality images through a viewfinder mode for an outward-facing image sensor.

The display system 1300 may further include a gaze detection subsystem 1310 configured for detecting a direction of gaze of each eye of a user or a direction or location of focus, as described above. Gaze detection subsystem 1310 may be configured to determine gaze directions of each of a user's eyes in any suitable manner. For example, in the illustrative example shown, a gaze detection subsystem 1310 includes one or more glint sources 1312, such as infrared light sources, that are configured to cause a glint of light to reflect from each eyeball of a user, and one or more image sensors 1314, such as inward-facing sensors, that are configured to capture an image of each eyeball of the user. Changes in the glints from the user's eyeballs and/or a location of a user's pupil, as determined from image data gathered using the image sensor(s) 1314, may be used to determine a direction of gaze.

In addition, a location at which gaze lines projected from the user's eyes intersect the external display may be used to determine an object at which the user is gazing (e.g. a displayed virtual object and/or real background object). Gaze detection subsystem 1310 may have any suitable number and arrangement of light sources and image sensors. In some implementations, the gaze detection subsystem 1310 may be omitted.

The display system 1300 may also include additional sensors. For example, display system 1300 may comprise a global positioning system (GPS) subsystem 1316 to allow a location of the display system 1300 to be determined. This may help to identify real world objects, such as buildings, etc. that may be located in the user's adjoining physical environment.

The display system 1300 may further include one or more motion sensors 1318 (e.g., inertial, multi-axis gyroscopic, or acceleration sensors) to detect movement and position/orientation/pose of a user's head when the user is wearing the system as part of a mixed reality or virtual reality HMD device. Motion data may be used, potentially along with eye-tracking glint data and outward-facing image data, for gaze detection, as well as for image stabilization to help correct for blur in images from the outward-facing image sensor(s) 1306. The use of motion data may allow changes in gaze location to be tracked even if image data from outward-facing image sensor(s) 1306 cannot be resolved.

In addition, motion sensors 1318, as well as microphone(s) 1308 and gaze detection subsystem 1310, also may be employed as user input devices, such that a user may interact with the display system 1300 via gestures of the eye, neck and/or head, as well as via verbal commands in some cases. It may be understood that sensors illustrated in FIGS. 13 and 14 and described in the accompanying text are included for the purpose of example and are not intended to be limiting in any manner, as any other suitable sensors and/or combination of sensors may be utilized to meet the needs of a particular implementation. For example, biometric sensors (e.g., for detecting heart and respiration rates, blood pressure, brain activity, body temperature, etc.) or environmental sensors (e.g., for detecting temperature, humidity, elevation, UV (ultraviolet) light levels, etc.) may be utilized in some implementations.

The display system 1300 can further include a controller 1320 having a logic subsystem 1322 and a data storage subsystem 1324 in communication with the sensors, gaze detection subsystem 1310, display subsystem 1304, and/or other components through a communications subsystem 1326. The communications subsystem 1326 can also facilitate the display system being operated in conjunction with remotely located resources, such as processing, storage, power, data, and services. That is, in some implementations, an HMD device can be operated as part of a system that can distribute resources and capabilities among different components and subsystems.

The storage subsystem 1324 may include instructions stored thereon that are executable by logic subsystem 1322, for example, to receive and interpret inputs from the sensors, to identify location and movements of a user, to identify real objects using surface reconstruction and other techniques, and dim/fade the display based on distance to objects so as to enable the objects to be seen by the user, among other tasks.

The display system 1300 is configured with one or more audio transducers 1328 (e.g., speakers, earphones, etc.) so that audio can be utilized as part of a mixed reality or virtual reality experience. A power management subsystem 1330 may include one or more batteries 1332 and/or protection circuit modules (PCMs) and an associated charger interface 1334 and/or remote power interface for supplying power to components in the display system 1300.

It may be appreciated that the display system 1300 is described for the purpose of example, and thus is not meant to be limiting. It is to be further understood that the display device may include additional and/or alternative sensors, cameras, microphones, input devices, output devices, etc. than those shown without departing from the scope of the present arrangement. Additionally, the physical configuration of a display device and its various sensors and subcomponents may take a variety of different forms without departing from the scope of the present arrangement.

Figure 15:
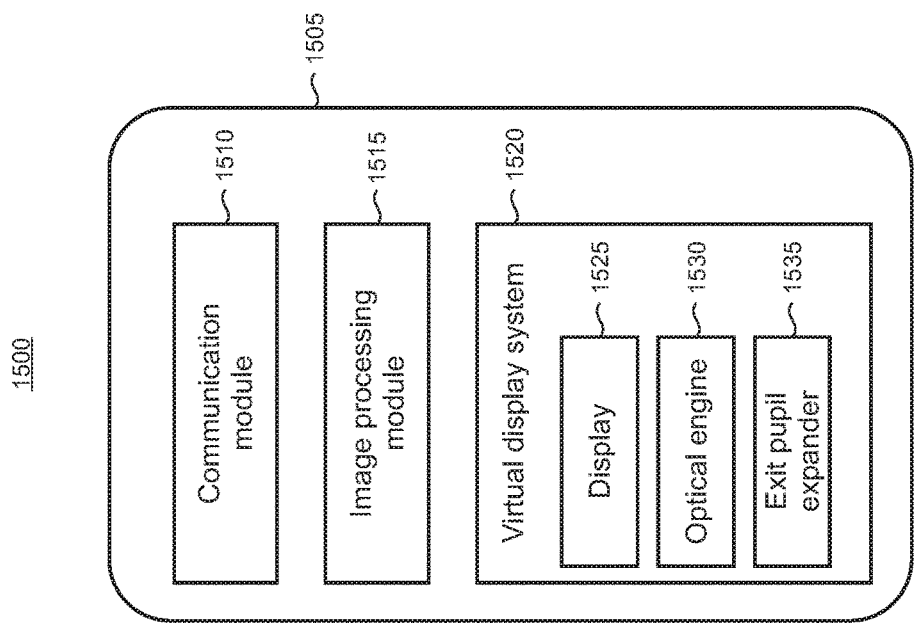
FIG. 15 shows a block diagram of an illustrative electronic device that incorporates an exit pupil expander.

As shown in FIG. 15, an EPE incorporating a DOE with integrated in-coupling, exit pupil expansion, and out-coupling can be used in a mobile or portable electronic device 1500, such as a mobile phone, smartphone, personal digital assistant (PDA), communicator, portable Internet appliance, hand-held computer, digital video or still camera, wearable computer, computer game device, specialized bring-to-the-eye product for viewing, or other portable electronic device. As shown, the portable device 1500 includes a housing 1505 to house a communication module 1510 for receiving and transmitting information from and to an external device, or a remote system or service (not shown).

The portable device 1500 may also include an image processing module 1515 for handling the received and transmitted information, and a virtual display system 1520 to support viewing of images. The virtual display system 1520 can include a micro-display or an imager 1525 and an optical engine 1530. The image processing module 1515 may be operatively connected to the optical engine 1530 to provide image data, such as video data, to the imager 1525 to display an image thereon. An EPE 1535 using a DOE with integrated in-coupling, exit pupil expansion, and out-coupling can be optically linked to an optical engine 1530.

An EPE using a DOE with integrated in-coupling, exit pupil expansion, and out-coupling may also be utilized in non-portable devices, such as gaming devices, multimedia consoles, personal computers, vending machines, smart appliances, Internet-connected devices, and home appliances, such as an oven, microwave oven and other appliances, and other non-portable devices.

Various exemplary embodiments of the present diffractive optical element with integrated in-coupling, exit pupil expansion, and out-coupling are now presented by way of illustration and not as an exhaustive list of all embodiments. An example includes an optical element, comprising: a substrate of optical material forming a waveguide; an in-coupling region integrated into the substrate, the in-coupling region having an input surface and configured to couple one or more optical beams incident on the input surface into the waveguide; and a beam steering and out-coupling region integrated into the substrate and configured for pupil expansion of the one or more optical beams along a first direction, wherein the beam steering and out-coupling region is configured with a two-dimensional (2D) grating that is periodic in two directions.

In another example, the 2D grating includes one of symmetric or asymmetric features. In another example, the asymmetric features include one of slanted gratings or blazed gratings. In another example, the beam steering and out-coupling region includes an output surface and is configured for pupil expansion of the one or more optical beams along a second direction, and further configured to couple, as an output from the output surface, one or more optical beams with expanded pupil relative to the input. In another example, differences among optical path lengths in the beam steering and out-coupling region exceed a coherence length so as to increase uniformity of the output optical beams.

A further examples includes an electronic device, comprising: a data processing unit; an optical engine operatively connected to the data processing unit for receiving image data from the data processing unit; an imager operatively connected to the optical engine to form images based on the image data and to generate one or more input optical beams incorporating the images; and an exit pupil expander, responsive to the one or more input optical beams, comprising a monolithic waveguide structure on which multiple diffractive optical elements (DOEs) are integrated, in which the exit pupil expander is configured to provide one or more output optical beams, using one or more of the DOEs, as a near eye virtual display with an expanded exit pupil, and wherein at least one of the DOEs has a region configured to implement beam steering and out-coupling of the output optical beams from the monolithic waveguide structure.

In another example, at least one of the DOEs has a region configured to in-couple the input optical beams into the waveguide structure. In another example, the input optical beams received at the exit pupil expander emanate as a virtual image produced by a micro-display or imager. In another example, the exit pupil expander provides pupil expansion in two directions. In another example, the imager includes one of light emitting diode, liquid crystal on silicon device, organic light emitting diode array, or micro-electro mechanical system device. In another example, the imager comprises a micro-display operating in one of transmission, reflection, or emission. In another example, the electronic device is implemented in a head mounted display device or portable electronic device. In another example, the monolithic waveguide structure is curved or partially spherical. In another example, two or more of the DOEs are non-co-planar.

A further example includes a method, comprising: receiving light at an in-coupling region of a diffractive optical element (DOE) disposed in an exit pupil expander; expanding an exit pupil of the received light along a first coordinate axis in a beam steering and out-coupling region of the DOE; expanding the exit pupil along a second coordinate axis in a beam steering and out-coupling region of the DOE; and outputting light with an expanded exit pupil relative to the received light at the in-coupling region of the DOE along the first and second coordinate axes using the beam steering and out-coupling region, in which the beam steering and out-coupling region includes gratings configured to provide a periodic contoured surface having a first periodicity along a first direction and a second periodicity along a second direction.

In another example, the periodic contoured surface comprises one of quadrangular elements, cylindrical elements, polygonal elements, elliptical elements, pyramidal elements, curved elements, or combinations thereof. In another example, the DOE is formed as a unitary optical structure using a polymer that is molded from a substrate that is etched using ion beam etching in which the substrate has changeable orientation relative to an ion beam source. In another example, the in-coupling region includes gratings configured to provide a periodic contoured surface having a third periodicity along a third direction and a fourth periodicity along a fourth direction. In another example, the method is performed in a near eye display system. In another example, the output light provides a virtual display to a user of the near eye display system.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. An optical element, comprising:
a monolithic substrate of optical material forming a waveguide in which one or more optical beams are propagated;
an in-coupling region integrated into the monolithic substrate, the in-coupling region having an input surface and configured with a one dimensional (1D) grating that is periodic in one direction to couple one or more optical beams incident on the input surface into the waveguide; and
a beam steering and out-coupling region integrated into the monolithic substrate and configured for pupil expansion of the one or more optical beams along a first direction,
wherein the beam steering and out-coupling region is configured with a two-dimensional (2D) grating that is periodic in two directions,
wherein the 2D grating is configured to provide at least two diverse optical paths to each of any given point in the 2D grating for the propagating optical beams, wherein differences between lengths of the at least two diverse optical paths to each of any given point exceed a coherence length of the propagating optical beams in the beam steering and out-coupling region so as to increase uniformity of output optical beams and thereby reduce optical interference.

2. The optical element of claim 1 in which the 2D grating includes one of symmetric or asymmetric features.

3. The optical element of claim 2 in which the asymmetric features include one of slanted gratings or blazed gratings.

4. The optical element of claim 1 in which the beam steering and out-coupling region includes an output surface and is configured for pupil expansion of the one or more optical beams along a second direction, and further configured to couple, as an output from the output surface, the one or more optical beams with expanded pupil relative to the input.

5. An electronic device, comprising:
a data processing unit;
an optical engine operatively connected to the data processing unit for receiving image data from the data processing unit;
an imager operatively connected to the optical engine to form images based on the image data and to generate one or more input optical beams incorporating the images; and
an exit pupil expander, responsive to the one or more input optical beams, comprising a monolithic waveguide structure in which one or more optical beams are propagated and on which multiple diffractive optical elements (DOEs) are integrated,
in which the exit pupil expander is configured to provide one or more output optical beams, using one or more of the DOEs, as a near eye virtual display with an expanded exit pupil, and includes an in-coupling region having an input surface and configured with a one dimensional (1D) grating that is periodic in one direction to couple the one or more input optical beams incident on the input surface into the monolithic waveguide structure,
wherein at least one of the DOEs has a region configured to implement beam steering and out-coupling of the one or more output optical beams from the monolithic waveguide structure, and
wherein at least one of the DOEs includes a two-dimensional (2D) grating that is periodic in two directions and configured to provide at least two diverse optical paths to each of any given point in the 2D grating for the propagating one or more optical beams, wherein differences between lengths of the at least two diverse optical paths to each of any given point exceed a coherence length of the propagating one or more optical beams in the beam steering and out-coupling region so as to increase uniformity of the one or more output optical beams and thereby reduce optical interference.

6. The electronic device of claim 5 wherein at least one of the DOEs has a region configured to in-couple the one or more input optical beams into the monolithic waveguide structure.

7. The electronic device of claim 5 in which the one or more input optical beams received at the exit pupil expander emanate as a virtual image produced by a micro-display or imager.

8. The electronic device of claim 5 in which the exit pupil expander provides pupil expansion in two directions.

9. The electronic device of claim 5 in which the imager includes one of light emitting diode, liquid crystal on silicon device, organic light emitting diode array, or micro-electro mechanical system device.

10. The electronic device of claim 5 in which the imager comprises a micro-display operating in one of transmission, reflection, or emission.

11. The electronic device of claim 5 as implemented in a head mounted display device or portable electronic device.

12. The electronic device of claim 5 in which the monolithic waveguide structure is curved or partially spherical.

13. The electronic device of claim 5 in which two or more of the DOEs are non-co-planar.

14. A method, comprising:
receiving light at an in-coupling region of a diffractive optical element (DOE) disposed in an exit pupil expander formed of a unitary optical structure in which one or more optical beams are propagated, wherein the in-coupling region has an input surface and is configured with a one dimensional (1D) grating that is periodic in one direction to couple the received light incident on the input surface into the exit pupil expander;
expanding an exit pupil of the received light along a first coordinate axis in a beam steering and out-coupling region of the DOE;
expanding the exit pupil along a second coordinate axis in a beam steering and out-coupling region of the DOE; and
outputting light with an expanded exit pupil relative to the received light at the in-coupling region of the DOE along the first and second coordinate axes using the beam steering and out-coupling region,
in which the beam steering and out-coupling region includes gratings configured to provide a periodic contoured surface having a first periodicity along a first direction and a second periodicity along a second direction, and
wherein the gratings of the DOE are configured to provide at least two diverse optical paths to each of any given point in the gratings for the propagating one or more optical beams, wherein differences between lengths of the at least two diverse optical paths to each of any given point exceed a coherence length of the propagating one or more optical beams in the beam steering and out-coupling region so as to increase uniformity of output optical beams and thereby reduce optical interference.

15. The method of claim 14 in which the periodic contoured surface comprises one of quadrangular elements, cylindrical elements, polygonal elements, elliptical elements, pyramidal elements, curved elements, or combinations thereof.

16. The method of claim 14 in which the DOE is formed as the unitary optical structure using a polymer that is molded from a substrate that is etched using ion beam etching in which the substrate has changeable orientation relative to an ion beam source.

17. The method of claim 14 in which the in-coupling region includes gratings configured to provide a periodic contoured surface having a third periodicity along a third direction and a fourth periodicity along a fourth direction.

18. The method of claim 14 as performed in a near eye display system.

19. The method of claim 18 in which the output light provides a virtual display to a user of the near eye display system.

* * * * *